May 28, 1957  G. R. PASCHAL  2,793,946
METHODS AND APPARATUS FOR THE PRODUCTION OF IRON
Filed Oct. 4, 1952  2 Sheets-Sheet 1
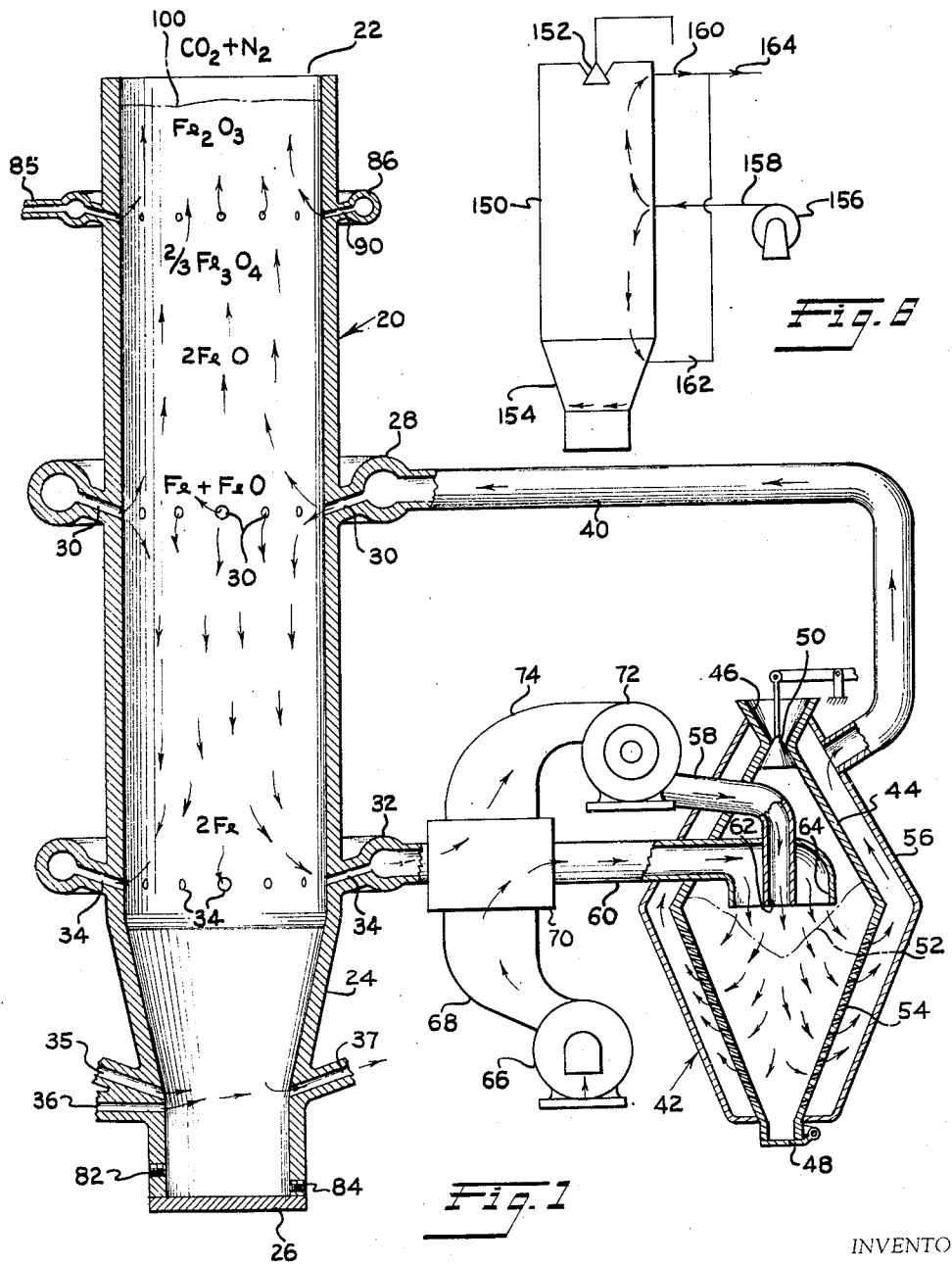
INVENTOR
GEORGE R. PASCHAL
BY Strauch, Nolan & Diggins
ATTORNEYS

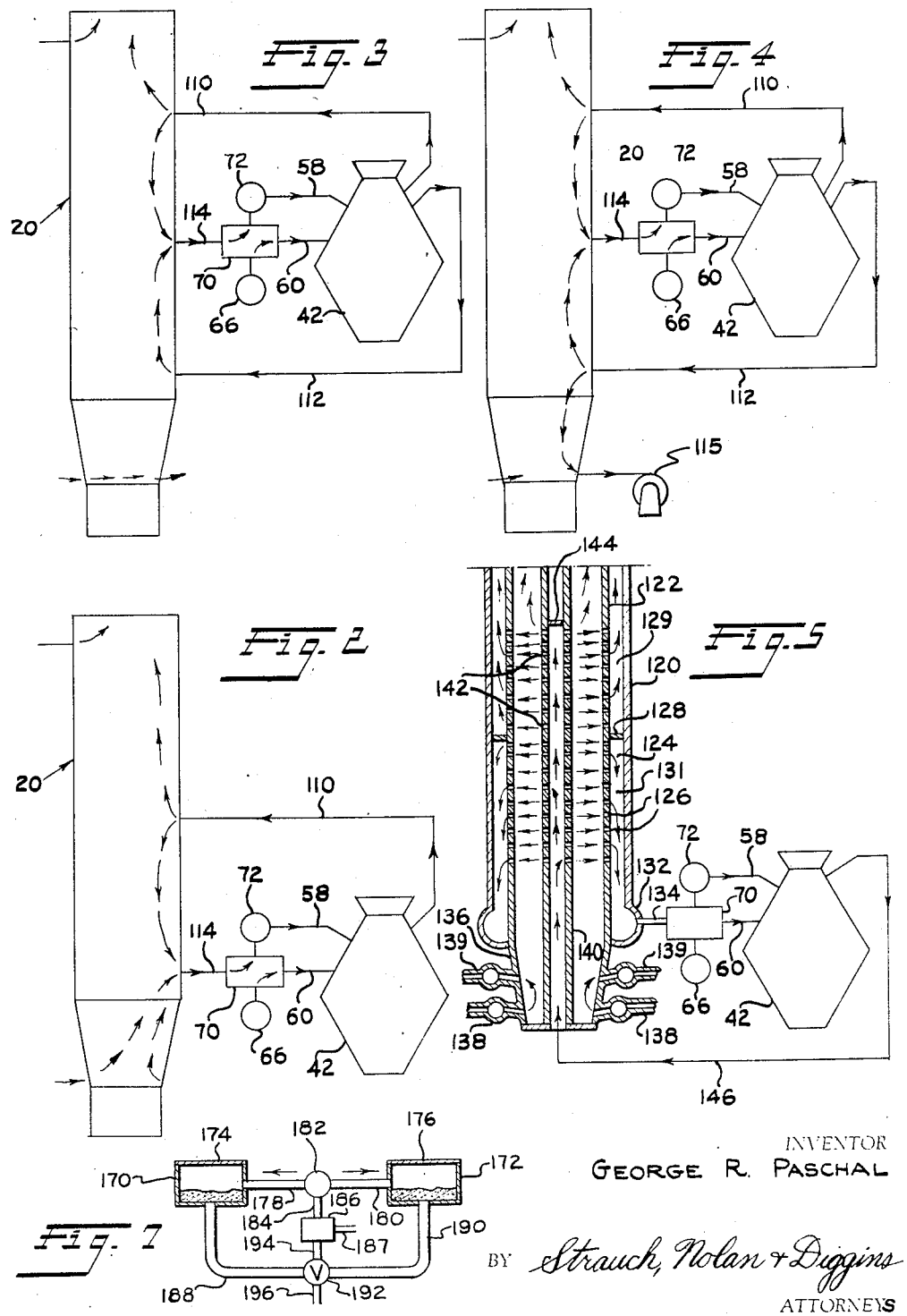

United States Patent Office 2,793,946
Patented May 28, 1957

2,793,946
METHODS AND APPARATUS FOR THE PRODUCTION OF IRON

George R. Paschal, Alexandria, Va.

Application October 4, 1952, Serial No. 313,110

7 Claims. (Cl. 75—41)

The present invention relates to methods and apparatus for the reduction of iron ores and the production of pig iron and steel or sponge iron therefrom and more particularly to novel methods and apparatus for the gaseous reduction of ore preferably with a recycle of part of the spent gas through a gas generator for the production of the reducing gas required.

The blast furnace produces by far the largest proportion of the iron of the world. Although it wastes fuel, it has a good rate of production and easily handles impure ores. But the blast furnace as now constituted fails of true efficiency in that its design and operating mechanism take only imperfect account of the chemical reactions and equilibria involved in ore reduction, and also show defects in heat transfer and in the movement of materials.

It is the primary purpose and object of this invention to overcome the major defects in blast furnace operation, thereby drastically reducing fuel requirements for the production of iron, and increasing furnace output per dollar of capital cost.

Inasmuch as the methods and apparatus of the present invention in their broadest aspects bear a closer relation to blast furnace processes than to the other major iron production techniques known today, a brief survey of what the blast furnace does and why it does it is believed essential to a clear understanding of the novel methods and apparatus herein disclosed.

Five basic operations take place in the blast furnace, and the physical and chemical requirements for each are different.

A blast furnace: (1) heats the ore, limestone and coke to drive off water and carbon dioxide and to bring the mass to reaction temperature; (2) reduces the higher oxides of iron to ferrous oxide, a reaction which can take place in the presence of considerable excess of carbon dioxide or water vapor over reducing gas; (3) further reduces ferrous oxide to iron, which requires relatively low percentages of carbon dioxide and water vapor; (4) generates carbon monoxide to effect the major part of these reductions, and (5) melts the iron and slags off the impurities so they may be easily removed. All other reactions and effects are subsidiary, and some of them are harmful.

It is common practice to introduce a heated air blast near the bottom of the furnace to burn coke there, thus furnishing heat to melt the iron and gas to reduce the ore further up the shaft. All the air introduced is pushed from one end of the furnace to the other, through an ore column some 80 feet high.

It will be noted that there are three steps in ore reduction. The first requires no reducing gas or carbon at all, but only the application of heat to remove combined water or carbon dioxide and to bring the ore to reaction temperature. The second needs carbon, carbon monoxide, hydrogen or hydrocarbon, but can operate to reduce the higher oxides of iron to ferrous oxide even when an excess of carbon dioxide or steam over reducing gas exists. But the third step, the reduction of ferrous oxide to iron, does not apparently go forward unless a large excess of reducing gas is present as compared with carbon dioxide or steam, and does not go forward at acceptable commercial speed unless that excess is well above the theoretical equilibrium point for the particular temperature and pressure used. For carbon monoxide reduction, this point at about average blast furnace temperatures in the zone of reduction is somewhat over two CO to one $CO_2$, but as stated, more CO is required to prevent the reduction from becoming sluggish. The desired effect is attained in the blast furnace by having surplus carbon in the zone of final reduction. This reacts with carbon dioxide to give the monoxide again, and so drives the reduction to completion but with serious loss of heat because of the endothermic nature of the reaction. This requires burning of extra fuel to compensate therefor.

It follows that in order to have enough carbon monoxide in the final reduction zone, a great surplus is produced over what is needed for the preliminary reductions and for heating the charge. This surplus passes out of the furnace and is then useful only as a low grade heating gas. The following reaction series shows in simplified form the principal reduction reactions involved. These are shown from the standpoint of the gas movement, and hence start with the zone of iron production near the tuyeres, and work up.

6FeO plus 18CO gives 6Fe plus 12CO plus $6CO_2$, $2Fe_3O_4$ plus 12CO plus $6CO_2$ gives 6FeO plus 10CO plus $8CO_2$, $3Fe_2O_3$ plus 10CO plus $8CO_2$ gives $2Fe_3O_4$ plus 9CO plus $9CO_2$.

It can be seen that in the conventional blast furnace, one cannot, even in theory, get more than 50% of the CO produced to react for iron production, and if allowance is made for excess CO needed for proper reaction speed, the ratio is even less favorable. But this theoretic loss, grave as it is, is magnified in practice through the endothermic reaction of carbon dioxide with coke which takes place with great ease in the hotter part of the furnace, resulting in withdrawal of heat from where needed, and production of more CO. The heat loss in turn means more coke must be burned with more added air to make up the deficiency, thus adding still more to the CO surplus, and to the fuel cost for the process. For most furnaces, the exit gases therefore, have over two volumes of CO for every volume of $CO_2$, so that less than one-third of the coke entering is fully used up in actually making iron. The off-gas has value, but use of metallurgical coke to produce it represents appreciable economic loss.

The merit of a blast furnace is simplicity of basic idea and of operation, but that basic simplicity is dearly bought in complication of auxiliary equipment, such as coke plant and gas handling apparatus, and in heavy capital and operating charges caused thereby. There are also manifold process inefficiencies, some mentioned above and others not yet listed. Major items of this character are:

(1) The use of two to three times as much coke as is actually needed to reduce the ore and furnish process heat;

(2) The requirement for special quality coke, of special size, since this is used not solely as a remover of oxygen from the ore, but also as a support for the tall ore column, and as a separator of pasty iron during production so it will not slump together and block gas passage at the excessive temperatures found in the lower part of the reduction zone. Coke strength, which ought to mean little, matters in fact very greatly, and this restricts the choice of fuels and raises the cost;

(3) The use of at least twice as much air as would be needed under proper process design, with direct loss in equipment cost and in power consumption for blowing, and with indirect loss through imperfect heat recovery from surplus gas;

(4) Several losses produced through having the coke in contact with the ore, including contamination of the iron with sulfur from the coke, the adding of silica and alumina to the charge as coke ash, thus requiring more flux and more fuel, and reduction of phosphorus and silica to the elements by direct action of carbon, with contamination of the iron;

(5) Losses through having the coke in contact with the gases, through reductions of carbon dioxide and steam, giving direct loss of coke by such "solution" and indirect loss through abstraction of heat in the melting zone through these reactions and return of a portion through reversal of the reactions in cooler zones where extra heat is not required;

(6) Losses through physical presence of the coke, which because of difference in density and size as compared with the ore, tends to separate in falling into the furnace, thus leading to channeling of gases through coke-rich areas, and also tends to occupy space that otherwise could contain ore.

It is accordingly the primary purpose and object of the present invention to provide novel methods and apparatus for the production of iron which in answer to a long standing unfulfilled need and demand in the industry overcome the above stated basic defects of the blast furnace.

It is a further object of the present invention to provide novel methods and apparatus for the production of pig iron with a more favorable ratio of output to cost and apparatus space than any process now known.

It is a further object of the present invention to provide novel methods and apparatus for the production of pig iron which eliminates much auxiliary equipment now commonly used with blast furnaces with a resulting significant reduction in cost of equipment and maintenance.

It is an additional object of the present invention to provide novel methods and apparatus for the production of iron which permits the utilization of low grade and consequently low cost fuel resulting in an important decrease in operating costs per unit of product.

It is also an object of the present invention to provide novel methods and apparatus for the production of better quality iron by reducing sulfur pick-up from the fuel used.

It is a further object of the invention to provide novel methods and apparatus for the production of iron which permit substantial savings in the quantity (and quality) of fuel required per ton of iron produced when compared with the best existing blast furnace practices and which offer additional savings in pumping costs, labor and other operating expenses while permitting very high tonnage output per square foot of apparatus and per dollar of capital investment.

It is a further object of the present invention to provide novel methods and apparatus for the production of iron which combine the inherent fuel economy of recycle processes with the large production, ruggedness, and generally unexacting nature of the blast furnace.

Other objects and advantages will become apparent as the description proceeds in connection with the accompanying drawings in which:

Figure 1 is a diagrammatic view partly in section of one form of the novel apparatus for performing the methods of the present invention;

Figures 2, 3 and 4 illustrate in diagrammatic form modifications of the apparatus of Figure 1;

Figure 5 illustrates in semi-diagrammatic form a further embodiment of the invention for carrying forward the novel methods herein disclosed;

Figure 6 is a semi-diagrammatic illustration of an additional embodiment of the invention; and Figure 7 is a diagrammatic illustration of another embodiment of the invention.

To provide a clear understanding of the invention, a few general principles of blast furnace operation must be touched on. First, the output of a blast furnace is—within limits—dependent on the quanity of reducing gas which can be brought into intimate contact with a given quantity of ore in a given time. Second, it is dependent on temperature, for this has a strong positive effect on the speed with which reduction reactions take place, and a mixed effect on the reducing power of the gases used, carbon monoxide being more completely used at relatively low temperatures, while hydrogen reduces the ferrous oxide more efficiently at high temperature. Third, the output depends on the constitution of the furnace gases, for reduction is faster with hydrogen than with carbon monoxide, and reduction with either slows considerably in speed as the equilibrium gas mixture for a particular temperature is approached. Fourth, reduction with carbon monoxide produces some heat, hydrogen reduction on average consumes a little, while carbon reduction consumes a great deal.

Finally, two very important physical factors limit present furnace output, for a conventional furnace will usually not "take" an air blast which is over a certain temperature, nor will a furnace operate properly if the air volume pushed through is too high. In the former case, an apparent dilemma exists, for unless high temperatures are produced in the bosh of the furnace, the iron and slag cannot be melted off, and no amount of gas having a temperature below the melting point of the pig (varying for different amounts of impurities from about 1350 to about 1500 centigrade), is of any use here. In this region, the more heat the better. Yet if rising gases from this melting zone carry temperatures in any considerable part of the middle zones of the furnace to say 1200 centigrade and above, the partly reduced ore may become pasty, slump together and thus cut off passage of the blast, so choking the furnace down. One major function of the coke in a furnace is to keep this pastiness in line by physically separating ore lumps and by cooling the gas through endothermic reaction with carbon dioxide. But as already stated, this solution of the problem is expensive in wasted coke, and limits the quantity of heat which can be applied.

The blast volume problem has the same aspect of apparently inescapable dilemma. Here the operator is ostensibly limited in the volume of gas that can be put through the charge per unit time. To force through more means that pumping effort and cost will rise rapidly, excessive blowing out of ore and coke will take place as flue dust, and the pressure of the blast on the burden may be so great as to hinder proper settling, resulting in the holding up of the ore for a period with subsequent collapse of the "bridged" ore and possible serious damage to the furnace.

Operation of the furnace under considerably increased top gas pressure, and use of air enriched in oxygen have both been brought forward as means for avoiding the blast volume problem. Manifestly, if the gas within the furnace is more highly compressed than normal, there is more per cubic foot to react with the ore, but the increased quantity takes up no more room than before, and exerts little more lifting force, assuming that the outlet gas pressure is raised in proper proportion. Similarly, a gas having less nitrogen allows more CO to be present. Both ideas have merit, but neither greatly reduces coke losses, while use of oxygen for the blast requires an oxygen plant, with extra expense.

Operation in accordance with the present invention greatly reduces both the blast heat and gas volume problems. The melting of the iron is separated from the reducing of the ore, and two distinct circuits are employed simultaneously in one furnace for these two distinct operations. The high temperature off-gas from the melting circuit is led out of the furnace through exit vents only a few feet distant from the entering tuyeres, and only an inconsequential portion passes up into the reduction zone. Thus as much heat as desired can be present in the bottom melting zone and at as high a temperature level as desired, limited only by the temperature the refractories can stand, without overheating the partly reduced ore.

The withdrawal of most or all of the high temperature gas from the heating zone, removes the gas which, in the conventional furnace, does the work of reducing the ore. In place of this gas stream, which in the blast furnace is forced through the entire ore column from the bottom of the furnace to and out the top, a special reducing gas stream of any desired optimum temperature for ore reduction (but preferably between 650° and 1400° centigrade, and best at 800°–1000° centigrade) is introduced at one or more points further up the furnace side. In the simplest form of the invention, the gas will be introduced about half way up the furnace. About one-half the reducing gas will be moved from this central point up the stack counter to the descending ore and thence out, while the other half of the gas will be directed down concurrent to the ore movement and will pass out through exit channels near the bottom but well away from the melting zone. It can be seen that if an equal split is made in the entering gas stream the quantity of reduction gas which can be forced through the reduction zone will be twice that now feasible.

To illustrate, assume a furnace will take 1500 cubic feet of gas per second without trouble, but can handle no more. If 3000 cubic feet per second is blown through tuyeres about halfway up the shaft side with proper exit channels at top and bottom, then, with equal burden to penetrate, half the total, or 1500 cubic feet per second, goes up and the other 1500 cubic feet goes down. No part of the furnace has exceeded its normal gas capacity, yet twice as much gas is being passed through the ore. It is also evident that by center entry, only half of the ore column must be traversed by each part of the split stream, and hence the pumping pressure will be halved.

While each gas stream is then in contact with the ore only half as long as in the conventional process, this does not nullify the advantage gained from bringing in twice as much reducing gas per second. Speed of gaseous reduction is high and furthermore the actual reduction zone in a conventional furnace is only a fraction of the column height, for part of the column is too hot and a larger part too cold for best operation. Two 40 foot streams of proper temperature give a much wider and more favorable reduction zone than is now found in the conventional 80 foot furnace. Further the zone of preparatory heating of the ore will clearly be shortened, but this can be done with great advantage to furnace efficiency, especially if a moderate amount of air is introduced by supplemental tuyeres a few feet below the top of the ore, to burn at this point surplus fuel values in the waste reducing gas. This will give local high temperature to preheat the ore to optimum reduction temperatures and to calcine limestone charged as flux. Thus the temperature profile in the new type furnace rises very rapidly from cool gas and cold ore at the top, to gas and ore at for example 1000° centigrade some ten feet down. This proper temperature, or a different one determined by the requirement of a particular installation is then maintained with relatively little change throughout the remaining 70 feet or so of reduction zone, then there is a very rapid rise to melting temperatures in the last few feet of the furnace, as the reduced ore enters the special melting circuit. This differs completely from the profile of the conventional furnace, which shows a fairly steady rise from the top down to the melting zone, and a much more limited area within optimum reduction temperatures.

While it is possible in accordance with the invention to load the furnace with coke and ore, and to blow in air to manufacture reducing gas therein, there are great advantages to manufacturing reducing gas outside the furnace, and to charging ore and flux without coke. Referring to the equations given above it will be noted that chemical equilibrium considerations require the presence of a large excess of reducing gas in the zone of ferrous oxide reduction, and that the excess so required is far more than is needed for preliminary reduction and preheating. Inventors such as Westman and Wiberg have already seen that by removing carbon dioxide and water vapor from a substantial portion of the gas, after it has passed the zone of ferrous oxide reduction, and by recycling a purified or regenerated reducing gas so made, equilibrium reduction conditions could be maintained in the lower part of the furnace with a smaller fuel consumption. In this manner, only so much gas is allowed to escape recycle as will serve to give the preliminary reduction, and to remove from the circuit the oxygen and nitrogen brought in by introduced gas and ore.

In the preferred embodiment of this invention, recycle of reduction gas regenerated outside the furnace is combined with the split-flow concept. It will be noted that leaving the coke out of the furnace approximately doubles the amount of ore which can be placed in the furnace at any one time, and this, plus a doubling of gas flow, vastly increases potential daily iron output per cubic foot of furnace space. Absence of the coke also eliminates various sources of loss already enumerated, caused by contact of coke with heated gases and ore.

In accordance with prior operating practice, as shown in U. S. Patent 1,401,222 to F. M. Wilberg, reducing gases are introduced at the bottom of the furnace, and proceed up the ore column, with the taking off of a suitable portion for recycle above the zone where ferrous oxide is reduced. In the preferred embodiment of the present invention, which embodies the new idea of side entry and split flow of reducing gas, the reducing gas is introduced at such point or points as will result in having about one-half the reduction of ferrous oxide to iron take place above the point of entry of the gas, and about one-half take place below, so that the downward flowing stream does only about half the final reduction. The upward flowing gas stream does the other half of the ferrous oxide reduction, all the preliminary reduction of the ore to the ferrous state, plus all the heating of the cold ore and calcining of limestone. The downward flowing stream, which has done the least work, is the one recycled.

At first glance this seems an unusual arrangement, but examination shows that if the reducing gas is prepared in the simplest and perhaps cheapest manner, by recirculating part of the spent gas through a producer gas generator charged with coal or coke, adding enough air to make the reactions for gas regeneration just self-sustaining as to heat, the greatest advantage will be obtained by recycling the downward flowing stream. It is necessary to maintain the equilibrium surplus of carbon monoxide in the zone of ferrous oxide reduction without loss of fuel in making "unused" off-gas. I have found that the most advantageous way to maintain the carbon monoxide surplus required is to recirculate gas which has suffered the least consumption of its carbon monoxide, since it will require the least chemical work done on it to regenerate a suitably pure product, and hence will need the least air and coal or coke supply. On the other hand, the best way to dispose of the non-recirculating stream is to use completely all of its fuel values before it exits from the furnace.

Inspection of the equations given herein will show that if one-half of the ferrous oxide is reduced to iron by the downflowing recycled stream, the upward-flowing other portion is sufficient to reduce the other half of the ferrous oxide to metal, and the off-gas from such reduction is sufficient to bring all the ore charged to the ferrous state, while carbon monoxide left over from this can furnish, with added air, rather more than enough heat to preheat and calcine the entering ore and flux. The upward-flowing gas stream can thus be completely utilized in the furnace with good efficiency and without noticeable waste of fuel, and the off-gas is then devoid of fuel values. The completely spent off-gas can be wasted to the air, and the gas-saving apparatus now required can be eliminated.

Assuming there is passed into the center tuyeres of the furnace a reducing gas composed substantially of $6CO$ plus $8N_2$, made as will be shown below, about half is to go up countercurrent to the entering charge. This will mean that the fresh gas will encounter ore already partly reduced, substantially all of which should have reached the ferrous state. The first equation will then be:

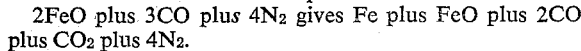

$2FeO$ plus $3CO$ plus $4N_2$ gives $Fe$ plus $FeO$ plus $2CO$ plus $CO_2$ plus $4N_2$.

The mixture of iron and ferrous oxide will descend in the furnace and encounter the downward-flowing gas stream. The partly used upward-flowing gas stream moves up the furnace and encounters the hematite charged, and reacts as follows:

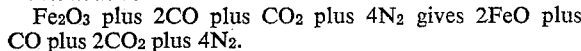

$Fe_2O_3$ plus $2CO$ plus $CO_2$ plus $4N_2$ gives $2FeO$ plus $CO$ plus $2CO_2$ plus $4N_2$.

Added air, above this point, heats the ore, as stated, and gives an off-gas of $3CO_2$ plus $6N_2$.

Returning to the mixture of iron and ferrous oxide produced by the upward-flowing gas stream, we find that its complete reduction by the lower stream is as follows:

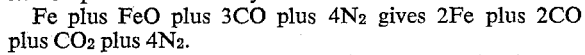

$Fe$ plus $FeO$ plus $3CO$ plus $4N_2$ gives $2Fe$ plus $2CO$ plus $CO_2$ plus $4N_2$.

The iron passes on down to the melting circuit, and the gas produced is recycled to yield new reducing gas for both streams as follows:

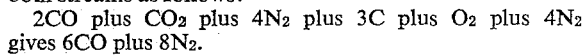

$2CO$ plus $CO_2$ plus $4N_2$ plus $3C$ plus $O_2$ plus $4N_2$ gives $6CO$ plus $8N_2$.

The above reaction is slightly exothermic, and hence self-sustaining. The air introduced can be preheated by bleeding off for fuel a minor part of the upward-flowing gas stream or a part of the surplus gas from the melting circuit. Other means are of course open if desired, and surplus heat can be produced at any time the processes seem to require, by blowing in more air in relation to recycle gas pumped.

From the foregoing it will be noted that reaction of the reducing gas has been assumed as proceeding to the equilibrium point, and that such point has been taken as $2CO$ for each $CO_2$ for reduction of ferrous oxide. It has also been assumed that the regenerated recycle gas contains no carbon dioxide. In other words, operation under ideal rather than practical conditions is assumed for the sake of sketching general operating principles. The fact that in practice full equilibrium will not ordinarily be reached, and that some carbon dioxide may escape re-forming in the gas regenerator, or that equilibrium ratio of carbon monoxide to dioxide varies according to the temperature under which reduction of the ore is taking place, does not affect the basic principles of this invention. In practice, these matters must be considered, and accordingly the recycle gas stream may have to be more than 50% of the entering gas, and a larger pumping burden assumed, but the same general principles of operation will nevertheless apply.

It will have been noted also that in the general exposition of operating principles, it is assumed that the reducing gas for recycle is made with make-up air. This immediately raises the question of recycling nitrogen. But inspection of the equations and flow sketches shows that although nitrogen is recycled, the gas in the furnace has less nitrogen than is found in the conventional blast furnace. This new process gives (for 50% recycle) a gas of about 43% carbon monoxide, while a simple burning of coke with air, as in the conventional blast furnace, gives a gas of only 33%. This invention is not, however, primarily concerned with the type or quality of reducing gas used, or the method of producing it, although one novel means for producing and circulating a suitable gas is disclosed below as a concrete embodiment of the invention in functioning form. It would be entirely within the scope of this disclosure to use oxygen instead of air, or even to use no outside gas at all, recirculating perhaps three-fourths of the furnace gas through a coke bed heated by electrical or other means to produce carbon monoxide and hydrogen from carbon dioxide and steam plus coke or coal. This last device, which has been advocated by others, is not thought the most economical practice, however. For coke or coal, use of air plus recycle gas seems economically attractive, even though nitrogen recycle ensues. For natural gas as the fuel, an improved method of reacting gaseous hydrocarbons with carbon dioxide or steam is the subject of a separate application. This has the advantage of producing a reducing gas almost wholly composed of carbon monoxide and hydrogen, without appreciable nitrogen, and thus allows a greater tonnage of ore to be reduced per day per unit furnace.

In the preceding discussion of the invention, entry of the reducing gas near the mid-point of the furnace shaft, with about half passing up and half passing down, was used as a general example. The invention is not concerned with a precise division of recycle and vented gases in the blast furnace system into streams of equal flow, however, but rather with the introduction and withdrawal of gases in such fashion as to make better use of the capacity of the furnace to handle them, considering the separate requirements for reduction and for melting. It is therefore within the scope of this invention to introduce part of the reducing gas, say two-thirds of the way up the stack, and another part above the melting circuit area, and to withdraw recycle gas at a point in between, and to vent out the top as little as 25% of the gas introduced, the remainder being recycled. Even more complex arrangements for gas flow are feasible and are within the scope of the invention. In the case cited above, two areas of recycle gas entry would permit, for example, the introduction of 3000 cubic feet per second two-thirds of the way up, and 1500 feet per second above the melting circuit. 1500 cubic feet per second might be vented out the top, and 3000 cubic feet recycled with considerable gain to furnace output of iron from larger volume of reducing gas and from countercurrent flow of part of such gas past the more fully reduced ore. Of course, the proportions of reduction done by the three streams differ from that contemplated for a two-stream arrangement.

In each case, however, each stream of gas in the furnace will traverse only a portion of the ore. Also in all cases the invention comprises a reducing circuit and a melting circuit, although it is within the scope of the invention for the melting gas circuit to be kept partly reducing, to finish reduction not completed above. It is also feasible for waste gas from the melting gas circuit to join the recycle reducing gas, although at a slight sacrifice of recycle gas quality.

In the general example previously given two units of iron (say 112 pounds) were reduced from the ore at an expenditure of about three units (36 pounds) of carbon. But further fuel consumption is met within the melting circuit. In simplest form, this latter might consist of an air blast superheated by passage through a pebble bed heat exchanger, such blast to be met by fuel oil, gas or powdered coal through separate or concentric tuyeres. Preheat to 1500 centigrade or above would seem feasible. The extreme temperatures so attained would melt out a hollow in the descending iron sponge and the gases would lose part of their heat in such melting. The still highly heated waste gas washing back from the iron would be taken off through adjacent exit ports. Part, with added air to consume the fuel values left in the off-gas (which is here assumed as only partly oxidized, so as to be neutral or slightly reducing to the iron), is recycled to preheat the entering air through a pebble bed or other heat exchanger. A surplus is, however, available for use in preheating the air for the reducing cycle gas regenerator, or for other purposes.

While by way of illustration, the melting agent has been described as a superheated gas introduced near the base of the furnace, it is within the scope of the invention to employ other melting agents, for example a liquid such as molten slag. The melting agent may be heated outside the furnace and be introduced to melt the iron and then withdrawn for further employment in the cycle if desired.

Assuming a use of natural gas as fuel for the melting blast, between 150 and 200 cubic feet would be required to melt off the two units of iron (plus slag) mentioned, if the off-gas were oxidized merely to a neutral condition. This would then be a requirement for 3000 to 4000 cubic feet per ton of iron produced. At 25¢ per 1000 cubic feet for gas, and $10.00 per ton for coal for the recycle reduction stream, total fuel cost per long ton of iron produced might then be of the order of $5.00.

It is a feature of the invention that the apparatus for carrying out the novel methods described above is extremely simple both in construction and in operation as will appear from a more detailed consideration of the drawings and particularly Figure 1 in which the preferred embodiment of the invention is shown.

In the apparatus of Figure 1, 20 indicates a stack or furnace which is preferably generally cylindrical in shape and terminates at its upper end in an open top and at its lower end in a tapered bosh section 24. For convenience in describing the unit 20 the term "furnace" will be used throughout the specification and claims, the word furnace being employed in its non-technical sense to define one or more containers in which the ore and other ingredients are supported while being subjected to one or more high temperature reactions.

The furnace 20 is preferably basically similar to the conventional blast furnace in outline and size. In a typical installation the unit 20 might be some eighty to ninety feet high and will be lined with a suitable refractory material in accordance with conventional practice. The bottom of the furnace 20 is closed with a refractory base 26. An annular bustle pipe 28 is supported on the exterior of the furnace and communicates with the interior of the furnace through a number of tuyeres 30 which are preferably arranged in equal circumferential spacing around the interior of the furnace. While the location of the entrance point of the tuyeres 30 into the furnace is not critical and may vary through a substantial range the tuyeres are preferably located approximately at the midpoint of the cylindrical section of the furnace to facilitate the establishment of the desired reducing gas flow pattern within the furnace. A second bustle pipe 32 is supported exteriorly of the furnace preferably at the point where the cylindrical section of the furnace joins the bosh 24 as shown in Figure 1. The bustle pipe 32 communicates with the interior of the furnace through a plurality of gas vents 34. Arranged at the lower end of the bosh section 24 of the furnace are a set or plurality of sets of tuyeres 35 and 36 through which fuel and air, respectively, are supplied under pressure from any suitable source, not shown. If desired, fuel and air may be supplied through concentric pipes. An exit pipe or plurality of pipes, 37 for the products of combustion is found near the tuyeres 35 and 36.

The bustle pipe 28 is connected through a conduit 40 to the outlet side of a gas producer, indicated generally at 42, which is shown by way of illustration only and may be replaced in practice by units of conventional or different design.

The gas producer 42 comprises an inner annular shell 44 which is provided with a loading opening 46 at its upper end and with an ash removal gate 48 at its lower end. A conventional closure 50 is provided to substantially seal the opening 46 after the producer is loaded with coke, coal or other carbonaceous material to the level indicated by the reference line 52. The upper section of the inner shell 44 is imperforate while the lower section is provided with a series of openings 54 which permit the free passage of gas therethrough but which are upwardly inclined to prevent the passage of coke or coal particles or ash. The inner shell 44 is surrounded by an outer annular shell 56 which collects the gases passing through the openings 54 and delivers them to the conduit 40.

The required gases are supplied to the interior of the producer through conduits 58 and 60 which pass through both the inner and outer shells and terminate in concentrically arranged openings 62 and 64 respectively. Air is supplied to the conduit 60 by a blower through a conduit 68 and a heat exchanger 70 which may be of any suitable design.

The gas entering the bustle pipe 32 through tuyeres 34 is drawn through the heat exchanger 70, in heat exchange relation with the air supplied by blower 66, by a blower 72 connected to the heat exchanger 70 by a conduit 74. It has been found that the pumping efficiency of the entire apparatus is substantially increased by the cooling of the gases in heat exchanger 70 before being passed through the blower 72. It will be understood that a heat exchanger 70 of high efficiency is preferably employed so that substantially all of the heat removed from the spent gas is resupplied to the gas producer in the air supply through conduit 60. If desired heat may also be supplied to the recycle gas in conduit 58 before it enters the producer 42, through heating means not shown. Also the conduit system may be so arranged as to extract the sensible heat from the recycle gas upstream of blower 72 and return it to such gas after it has passed the blower 72, through employment of a heat exchanger, and the air entering may be heated separately. These modifications are not shown in the drawing.

Fuel and preheated air are forced into the bosh 24 through tuyeres 35 and 36 by means not shown. The fuel and air mixture is burned within the furnace to melt the products of the reduction above and exits through pipe 37. Suitable openings 82 and 84 may be provided adjacent the bottom of the bosh through which the slag and iron respectively may be withdrawn in liquid form.

A bed for lime pebbles (not shown) may be inserted into conduit 40 to remove sulfur from the gasified fuel. While the apparatus thus far described is capable of performing the methods described above with high efficiency it may in some cases be desirable to supply additional air adjacent the top of the furnace to preheat the ore. Bustle pipe 86 may be provided for this purpose. In this case air under pressure will be supplied from any suitable source through the inlet conduit 85 to the bustle pipe 86 and thence through tuyeres 90 into the interior of the furnace to supply heat by burning with fuel gas there present.

In practice the furnace will initially be loaded to the level shown at 100 with ore and flux preferably in the form of pieces or pellets of relatively small size. Assuming that the ore consists essentially of $Fe_2O_3$ and that the reducing gas supplied through tuyeres 30 consists principally of CO and $N_2$ the reduction of the ore will take place substantially as shown in Figure 1. As shown, the initial reduction to $Fe_3O_4$ will be substantially completed at a level immediately below the air tuyeres 90. The reduction to FeO will be substantially completed at a point approximately two-thirds of the way from the top of the furnace to the reducing gas tuyeres 30. At the level of the tuyeres 30 approximately half of the FeO will have been reduced to metallic iron. The correct proportions of flow, which may preferably be close to 50% upwardly and 50% downwardly from the tuyeres 30 will be determined in practice by the positioning of the tuyeres 30 and 34 with respect to the top of the ore as correlated with the relative quantities of gas drawn out by blower 72.

As the ore descends from the level of the tuyeres 30 the reduction of the remaining FeO to Fe is completed, the final reduction taking place at or slightly above the level of the tuyeres 34. The reduced iron then descends through the bosh where it is melted by the melting agent introduced and removed through the tuyeres 35, 36 and 37 respectively. As stated above the melting agent may be air or other superheated gas or may be a superheated liquid, for example, slag.

The off-gas leaving the top of the furnace will be substantially $CO_2$ and $N_2$ which need not be recovered, although a cover and double bell may be provided if pressure operation to increase capacity still further or for other purposes is desired.

As indicated by the equations and discussion given above the partially spent reducing gas exiting through tuyeres 34 will consist primarily of CO and $CO_2$ in a ratio exceeding 2 to 1 plus $N_2$. By introducing this gas into a surrounding air column above the level of the fuel in the gas producer as shown in Figure 1 an exothermic reaction will occur which produces sufficient heat to carry forward the endothermic reaction with the coal or coke which finally yields CO and $N_2$ (plus variable amounts of hydrogen).

The apparatus of Figure 2 is in all respects the same as that of Figure 1 except that the melting agent travels upwardly and is withdrawn by blower 72 together with the partially spent reducing gas to minimize the waste heat which would otherwise be present in the gases exiting from the melting circuit.

In the apparatus of Figure 3 the entering reducing gas is divided preferably into two streams, one portion being delivered to the upper section of the furnace through a conduit 110 and the remainder being introduced near the bottom of the furnace through a conduit 112. The location of the point of entry of the upper conduit 110 into the furnace and the volume handled by blower 72 is preferably so arranged that approximately one-half of gas supplied through conduit 110 passes out of the top of the furnace, the remainder being withdrawn through conduit 114 for recycle as described above. Substantially all of the gas supplied to the lower part of the furnace through conduit 112 will also be recycled through conduit 114.

The apparatus of Figure 4 is substantially the same as that shown in Figure 3 except that by reducing the distance between 112 and the point for exit of melting cycle gas, or by use of a blower 115 a portion of the reducing gas is induced to flow down to burn with added air in the lower part of the furnace to give melting heat. This flow maintains a reducing atmosphere throughout the furnace to assure the complete final reduction of all of the ore to metallic iron.

Figure 5 illustrates a modified form of apparatus for obtaining the advantages of split flow and recycle in accordance with the methods of the present invention. The furnace shown in Figure 5 comprises a cylindrical imperforate outer wall 120 and an inner cylindrical wall 122 spaced from the outer wall to form an annular channel 124 therebetween. The inner wall 122 is provided with a plurality of apertures 126 to permit the free flow of gas from the interior of the furnace into the channel 124. A horizontal plate 128 extends between the inner and outer walls approximately mid-way between the top and bottom of the furnace to divide the channel 124 into an upper section 129 and a lower section 131 for a purpose to appear. The top of the channel 124 is open while at its lower end the channel communicates with a bustle pipe 132 which in turn communicates through a conduit 134 with the auxiliary recycle apparatus described above. Below the bustle pipe 132 the furnace is provided with a bosh section 136 and means 138 for introducing a melting agent similar to the corresponding elements described in connection with Figure 1. The melting agent may be withdrawn through pipe 139.

Mounted on the floor of the bosh 136 centrally in the furnace is a vertically extending conduit 140 which is provided with a plurality of apertures 142 along its length. While the top of the conduit is open a horizontal wall 144 prevents direct flow of gas from the bottom of the conduit out of the top thereof. At its lower end the conduit 140 is in communication with the output conduit 146 of the gas producer 42.

In operation the furnace is loaded with ore and flux in the same manner as the furnaces disclosed in Figures 1 through 4. Reducer gas is then introduced into the lower end of conduit 140 and travels upwardly through the conduit and outwardly across the furnace as shown by the flow arrows. Thus, each portion of the reducer gas traverses only a relatively small portion of the ore. The portion of the gas entering the lower channel portion 131 below the horizontal wall 128 is withdrawn through the bustle pipe 132 and recycled in a manner similar to that described in connection with Figure 1. The remainder of the gas which enters the upper channel portion 129 above the wall 128 leaves the furnace either through the main opening or through the top of channel 129. As is well-known in the art the initial reduction reactions are much more easily carried out than the final reactions and the equilibrium conditions at the top of the furnace require a much lower concentration of CO. It is for this reason that the reducing gas at the upper end of the furnace can be passed directly to the air as waste. The reactions in this type of apparatus are substantially the same as those described in connection with the furnace of Figures 1 through 4.

In connection with Figure 5 it is to be understood that it is also within the scope of the invention to pass the gas directly across the bed of ore and flux from one side of the furnace to the other rather than to introduce the reducing gas through a central conduit as shown.

Figure 6 illustrates a further embodiment of the invention by which the advantages of split flow may be realized without recycle by the manufacture of reducing gas inside a furnace charged with ore and coke in the conventional manner.

In the apparatus of Figure 6 the furnace 150 is of conventional design provided with a bell 152 at its top and a bosh 154 at its lower end. A blower 156 supplies air through a conduit 158 to a point approximately at the center of the furnace, the flow being split in the same manner as that described in connection with Figure 1. The products of combustion and ore reduction are withdrawn from the top and bottom of the furnace respectively through conduits 160 and 162 which are joined and passed to a gas recovery apparatus through the conduit 164. A melting circuit is also found as in other figures.

Figure 7 illustrates a further embodiment of the invention which may be used to advantage in the production of powdered or sponge iron. In the apparatus of Figure 7 the furnace comprises two separate containers 170 and 172 which are closed by the respective covers 174 and 176. Reducing gas is supplied to the units 170 and 172, respectively, through conduits 178 and 180 which are connected through a flow divider 182 to the outlet conduit 184 of a gas producer or regenerator 186 which may be of the same construction as the unit 42 described above, make-up air being supplied if desired through conduit 187.

The reducing gas streams, after passing through the beds of ore in the containers 170 and 172 are withdrawn therefrom through conduits 188 and 190 which are connected to inlet ports of a valve 192. The outlet ports of valve 192 are connected, respectively, to a conduit 194 leading to the regenerator 186 and to a conduit 196 vented to the atmosphere. The valve 192 is arranged to connect either conduits 188 and 194 while connecting conduits 190 and 196 or to connect conduits 188 and 196 while connecting conduits 190 and 194.

Initially reducing gas is directed through only one of the units 170 or 172 and the flow of gas is continued until the ore is partially reduced, for example, to the point where it is in the form of Fe and FeO. During this period the spent gas may be exhausted through conduit 196.

Assuming that unit 170 contains the partially reduced ore and that unit 172 is loaded with fresh ore, the valve 192 is operated to connect conduits 188 and 194 and 190 and 196. This flow pattern will be continued until the ore in unit 170 is reduced to Fe at which time the ore in chamber 172 will be reduced to Fe and FeO. The process will then be stopped to permit removal of the iron from chamber 170 and the loading of this chamber with fresh ore.

Valve 192 is then shifted to connect conduits 188 and 196 and conduits 190 and 194 and this flow pattern continued until the reduction of the ore in chamber 172 is completed. The process may then be continued by emptying and refilling the chambers alternately.

It will be noted, that, as in the apparatus, for example, of Figure 1, the reducing gas utilized to effect the initial reduction is bled from the system while the gas utilized to effect the final reduction is recycled.

It is to be understood that various combinations of the features illustrated in each of the figures are also within the scope of the invention.

From the foregoing it will be seen that the present invention has attained the above stated objects and has provided, in answer to a long standing unfulfilled need and demand in the industry, methods and apparatus for the reduction of iron ore which overcome the basic defects of the blast furnace and other prior methods and apparatus for the reduction of iron ores.

The novel processes herein disclosed have inherently a much higher output per square foot of apparatus and per dollar of investment than does any existing method and are adaptable to the use of fuel oil, gas or any grade of coil as fuel or reducer. Further the benefits of the present methods and apparatus are effected without loss of the advantages of the ruggedness and generally unexacting nature of the blast furnace.

Important savings are realized by the present invention in the quantity and quality of the fuel required per ton of iron produced as compared with the best existing blast furnace practice. Additional savings are effected in pumping costs, labor and other operating expenses while permitting very high tonnage output per furnace per day. The methods and apparatus of the present invention are even less exacting than the blast furnace with respect to the grade of ore used and despite this produce a better quality of iron because of the absence of contamination of the metal produced with sulphur or other undesired substances in the fuel.

The invention may be embodied in other specific forms without departing from the spirit or essential characteristics thereof. For example, it will be understood that the advantages of recycle may also be obtained in a system where two or more furnaces are used, by introducing into one or more of the furnaces, the regenerated partially spent gas withdrawn from one or more of the other furnaces. The term "recycle" as used herein is intended to embrace such an arrangement. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a process for the production of iron from iron ores in a furnace, the steps of introducing a reducing gas into said furnace at a temperature sufficient to reduce said ore but insufficient to melt the reduced ore, introducing into the same furnace melting fluid to melt the reduced ore, at least a portion of the reducing gas being introduced separately from said melting fluid, removing from 20 percent to 85 percent of the reducing gas from said furnace for regeneration and recycle after it has become at least partially oxidized, regenerating said reducing gas by reacting a suitable portion with substances of the class consisting of hydrocarbons in gas form, liquid hydrocarbons and solid carbonaceous materials, and reintroducing said reducing gas into said furnace.

2. A process for producing iron from iron ores in a furnace comprising the steps of forcing a reducing gas produced by suitable means outside the furnace into said furnace containing said ore, introducing the said reducing gas at a temperature in the range from 650 centigrade to 1400 centigrade into the ore through a plurality of openings, directing a substantial portion of the reducing gas upwardly counter to the descent of the ore to be reduced, and directing the remainder of said reducing gas downwardly in the direction of travel of the descending ore, together with the step of introducing a melting fluid into said furnace at a point below the point of introduction of said reducing gas so that the iron and slag may be melted and withdrawn in liquid form.

3. A process according to claim 2 together with the steps of withdrawing a portion of said reducing gas and said melting fluid in a common stream from a point intermediate the points of introduction of said reducing gas and said melting fluid.

4. The process according to claim 2 together with the step of withdrawing the reducing gas and the melting fluid from the furnace at separate points.

5. A process for producing iron from iron ores in a furnace comprising the steps of forcing a reducing gas produced by suitable means outside the furnace into said furnace containing said ore, introducing the said reducing gas at a temperature in the range from 650 centigrade to 1400 centigrade into the ore through a plurality of openings, directing a substantial portion of the reducing gas upwardly counter to the descent of the ore to be reduced, and directing the remainder of said reducing gas downwardly in the direction of travel of the descending ore, together with the steps of introducing a heated gas containing elemental oxygen into said furnace at a point below the point of introduction of said reducing gas, introducing a combustible material of the class consisting of carbon monoxide, hydrogen, hydrocarbons or carbonaceous materials at a point closely adjacent to the entry of said gas containing elemental oxygen whereby said oxygen will react with said combustible material to produce a temperature above the melting point of the iron and slag whereby these may be withdrawn in liquid form.

6. In apparatus for the production of iron from iron ores in a furnace, first tuyeres adjacent the top of the shaft in said furnace, means for injecting an oxidizing gas through said first tuyeres to burn with fuel in the region between the first tuyeres and the top of the ore to heat the ore, which is kept above the level of such first tuyeres to proper reaction temperature, second tuyeres below said first tuyeres for injecting reducing gases to reduce the ore, means forming exit openings below said second tuyeres, means for withdrawing a portion of the reducing gas through said exit openings after it has contacted the ore, third tuyeres adjacent the bottom of said furnace, and means for injecting throught said third tuyeres a melting agent for melting the products of the ore reduction whereby said products may be withdrawn from the bottom of said furnace in liquid form.

7. The apparatus as defined in claim 6 together with additional tuyeres below said exit openings in said furnace and means for introducing reducing gas through said additional tuyeres, said reducing gas being withdrawn from said openings together with a portion of said reducing gas introduced through said first tuyeres.

References Cited in the file of this patent

UNITED STATES PATENTS

| | | |
|---|---|---|
| 407,156 | Blair | July 16, 1889 |
| 470,481 | Gill | Mar. 8, 1892 |
| 538,004 | Williamson | Apr. 23, 1895 |
| 2,201,738 | Neve | May 21, 1940 |
| 2,598,735 | Webb | June 3, 1952 |
| 2,609,288 | Stuart | Sept. 2, 1952 |

FOREIGN PATENTS

| | | |
|---|---|---|
| 697 | Great Britain | 1870 |
| 413,928 | Germany | May 19, 1925 |